United States Patent

Sakata et al.

[11] Patent Number: 5,858,448
[45] Date of Patent: Jan. 12, 1999

[54] PROCESS FOR PREPARING TEXTURED SOYBEAN PROTEIN

[75] Inventors: Tetsuo Sakata, Sennan-gun; Nobuhiro Otsubo, Kaizuka; Hirofumi Kugitani, Sennan-gun; Noriko Baba, Izumisano; Motohiko Hirotsuka, Kyoto, all of Japan

[73] Assignee: Fuji Oil Co., Ltd., Osaka-fu, Japan

[21] Appl. No.: 882,293

[22] Filed: Jun. 25, 1997

[30] Foreign Application Priority Data

Jun. 27, 1996 [JP] Japan ................................. 8-167575

[51] Int. Cl.⁶ ............................... A23J 1/00; A23B 4/03; A23B 1/10; A23P 1/00
[52] U.S. Cl. ..................... 426/656; 426/634; 426/511; 426/449; 426/486
[58] Field of Search ................................. 426/634, 656, 426/511, 447, 449, 486

[56] References Cited

U.S. PATENT DOCUMENTS

| | | | |
|---|---|---|---|
| 3,754,926 | 8/1973 | Strommer et al. | 426/511 |
| 3,764,708 | 10/1973 | Aonuma et al. | 426/511 |
| 4,152,465 | 5/1979 | Kijima et al. | 426/455 |
| 4,450,176 | 5/1984 | Stahel | 426/486 |

*Primary Examiner*—Anthony J. Weier
*Attorney, Agent, or Firm*—Armstrong, Westerman, Hattori, McLeland & Naughton

[57] ABSTRACT

This invention provides a process for preparing a textured soybean protein (TSP), the process having the steps of pressurizing and heating a raw material containing a soybean protein and water, quickly releasing the pressure to texturize the protein, bringing the obtained TSP into contact with steam while the TSP remains hot and is not completely dried. According to the process of this invention, a TSP having a good flavor can be produced in a simple and economical manner.

5 Claims, No Drawings

PROCESS FOR PREPARING TEXTURED SOYBEAN PROTEIN

FIELD OF THE INVENTION

The present invention relates to a process for preparing a textured soybean protein having a good flavor in a simple and economical manner.

PRIOR ART

A currently predominant method for preparing a textured soybean protein is the so-called extrusion cooking method in which water is added to a soybean protein as a raw material and the mixture is pressurized, heated and extruded. Also known is a method comprising heating and flowing a slurry of soybean protein under a back pressure and discharging the slurry through an orifice to give a textured soybean protein superior in fibrous structure.

The textured soybean protein (hereinafter referred to as "TSP") produced by either of the above methods has a high water retentivity and finds applications as cheap food materials for incorporation into mincemeat foods or the like. Commercial products of the former are available in a dry form with a water content of up to 10%, and those of the latter in a hydrous, mostly frozen form.

However, TSP's generally have a peculiar smell of their own, namely the so-called soybean odor. Accordingly TSP-containing foods may have a taste and odor of extraneous nature depending on the kind of the food.

Heretofore various methods have been researched to eliminate the "soybean odor" of TSP.

For example, Japanese Examined Patent Publication No.2940/1980 discloses a method for deodorizing a TSP, comprising adding water to a TSP to adjust the water content, heating the TSP to release the smell and exposing the TSP to overheated steam for deodorization.

Yet this method poses problems. For example, the method involves two steps, i.e. a smell-releasing step and a deodorizing step. Moreover, on exposure to overheated steam having a high temperature in the deodorizing step, the TSP may change the properties and may readily harden and discolor. Further, techniques and apparatus are needed to adjust the overheated steam in the deodorizing step.

DISCLOSURE OF THE INVENTION

A primary object of the present invention is to provide a process for preparing a TSP by a simple procedure, the process being capable of easily producing a TSP with a good flavor without a likelihood of hardening and discoloring.

The inventors of the present invention carried out extensive research to overcome the foregoing problems and developed the following process. The process comprises heating a soybean protein under an increased pressure or a back pressure using an extruder, a pipe heat exchanger or the like, extruding or discharging the protein for texturization, and bringing the obtained TSP into contact with steam while the TSP holds a suitable amount of water and remains hot, whereby the TSP can be conveniently deodorized in a single step without a need for a smell-releasing step. Furthermore, this process eliminates a need for overheated steam. Above all, because of simplification to a single heating step, the TSP is produced without a likelihood of hardening or discoloring and is given an excellent flavor. Based on this novel finding, the present invention was completed.

According to the present invention, there is provided a process for preparing a TSP, the process comprising the steps of pressurizing and heating a raw material containing a soybean protein and water, quickly releasing the pressure to texturize the protein and bringing the obtained TSP into contact with steam while the TSP remains hot and is not completely dried.

In the process of the present invention, the soybean protein can be texturized in the conventional manner, namely by pressurizing and heating a water-containing soybean protein as a raw material and quickly releasing the pressure. Such conventional texturization methods include, for example, (a) a method comprising pressurizing and heating a water-containing soybean protein as a raw material, extruding the material into normal pressure such as atmospheric pressure or into reduced pressure for texturization to give a TSP, that is to say, the so-called extrusion cooking method, and (b) a method comprising preparing a slurry from a water-containing soybean protein as a raw material (generally the pH is adjusted to approximately an isoelectric point), heating the slurry in a pipe conduit using a pipe heat exchanger, ejector or the like and discharging the slurry through an orifice generating a back pressure to texturize the protein into a fibrous material. In the process of the present invention, texturization must be achieved by rapidly releasing the pressure. When the pressure is gradually lowered using a cooling die, the TSP is so densified that flavor can not be satisfactorily improved by contact with steam as described later. Hence it is undesirable.

Soybean proteins which can be used as a raw material in heat-texturization are oil- and fat-containing soybean powders, fat-containing soybean protein concentrate, defatted soybeans, powdered soybean milk, soybean protein concentrate and isolated soybean protein. Generally soybean proteins can be more easily texturized if free of oil. Yet, if a twin-screw extruder is used, even oil-containing soybean proteins can be easily texturized. Other proteins than soybean proteins can be used in combination with soybean proteins. Preferred other proteins are heat-gelable vegetable proteins, e.g. proteins derived from oil stuff seeds such as peanut, rapeseed or cottonseed and proteins derived from grains such as wheat, corn or rice. Animal proteins and microbe-derived proteins are also usable in the invention. In this case, it is suitable that a soybean protein as a raw material accounts for at least 30% by weight (% by weight will be hereinafter referred to merely as %), preferably at least 50%, of the total proteins. Conventional adjuvants such as edible oils, starch, seasonings, dietary fibers, gelling agents, gummy materials and the like are conjointly usable in the invention.

When the so-called extrusion cooking method is employed as a heat-texturizing method, a twin-screw extruder generating a less burnt smell is used in preference to a single-screw extruder. The heat-texturization can be conducted under the conventional conditions. For example, if a twin-screw extruder is used, the extruder is operated preferably at a pressure of 2 to 50 kg/cm$^2$ and a temperature of about 120° to about 180° C. on its outlet side. The raw material containing about 15 to 70% of water can be texturized, while the raw material containing about 20 to about 40% of water can be brought to a satisfactorily swelled state, and hence it is preferable.

If a heat-texturization method is used which comprises heating and flowing a slurry of soybean protein using a pipe heat exchanger, an ejector or the like and discharging the slurry through an orifice generating a back pressure, the slurry having a solid content of 22 to 35% can be discharged from an orifice at a temperature of at least 120° C. and under a back pressure of at least 5 kg/cm$^2$.

According to the invention, it is important that after texturization of soybean protein in this way, the obtained TSP be brought into contact with steam while the TSP remains hot and is not completely dried up.

If after texturization of soybean protein, the TSP is cooled with a lapse of time, or the water content of TSP is diminished due to drying, it would be difficult to attain the contemplated effect by contact of TSP with steam. If the contact with steam occurs at a low TSP temperature, the energy of steam is consumed to elevate the TSP temperature, resulting in reduction of deodorizing efficiency. If the water content of TSP has been reduced before contact with steam, the TSP is deodorized in a less degree by contact with steam presumably because the soybean odor has been fixed when dried. Since the soybean odor is increasingly adsorbed on the protein with a lapse of time after texturization, the TSP must be contacted with steam as quickly as possible. If the TSP, is contacted with steam after becoming a finished product due to drying, the deodorizing effect would be reduced and the following disadvantage would be entailed. While the finished product has already hardened when heated and dried in becoming a finished product, the product must be heated with steam for elevating its temperature and further excessively heated for becoming moist, resulting in further hardening in texture. Also the product requires an additional step, in other words a smell-releasing step and a deodorizing step and is hence undesirable.

In the extrusion cooking method, usually the TSP temperature is about 95° to about 100° C. and its water content is about 12 to about 67% immediately after heat-texturization with an extruder. Before contact with steam, the TSP may be cooled a little and water may be partly vaporized while being carried, e.g. on a conveyor. Even in this case, it is suitable that when contacted with steam, the TSP has a temperature of 45° C. or higher, preferably 80° to 100° C. and a water content of at least 12%, preferably 20 to 67%.

In the producing process using a pipe heat exchanger, an ejector or the like, a TSP is heat-texturized and quickly discharged into the atmosphere, whereby the TSP is cooled and water is evaporated. Thus, after discharge, the TSP temperature is lowered to about 95° to about 100° C. and its water content to about 63 to about 78%. Before contact with steam, the TSP may be cooled a little and water may be evaporated during transport, e.g. on a conveyor, thereby reducing the water content. Even in this case, it is proper that the TSP has a temperature of about 45° C. or higher, preferably 80° to 100° C. and a water content of about 60% to about 77%.

As apparent from the above, the desired parameters of TSP remaining hot and not completely dried are a TSP temperature of about 45° C. or higher and a water content of about 12% or greater.

The steam to be contacted with a TSP in the present invention may be usual saturated steam and need not be overheated steam as in conventional methods. Hence it is economical.

The amount of steam to be used is preferably in the range of 5 to 1,000% by weight of a TSP. If the amount of steam to be contacted is less than this range, a lowered deodorizing effect results, whereas more steam used can not increase the deodorizing effect. Thus a proper amount of steam is preferably 7 to 500%, more preferably 10 to 200%. The period of time for contact with steam is about 1 second to about 1 hour. If the contact time is shorter, a lower deodorizing effect is exhibited, whereas if it is longer, an enhanced effect is not shown. Accordingly a proper contact time is preferably about 10 seconds to about 20 minutes, more preferably about 30 seconds to about 10 minutes.

Steam may be brought into contact with a TSP held stationary. However, a preferred contacting method is to float the TSP in steam for contact. A TSP floating in steam can more efficiently come into contact with steam. For contacting with steam, usable equipment includes steam boiling kettles, steamers, tunnel- and oscillating-type fluidized beds and the like. For example, when a steam boiling kettle is used, steam may be supplied at a positive internal pressure or at a slightly negative internal pressure to remove soybean odor. Of steamers, a tunnel-type steamer is suitable for use in continuous treatment.

Among these contacting methods, a method using a tunnel- and oscillating-type fluidized bed is preferred because it can more efficiently bring a TSP into contact with steam. In the fluidized bed used in the method, an oscillating-type conveyor with a tunnel structure has a meshed bottom so that the TSP can be floated in a fluid state over the meshed bottom through which steam is blown upward. Because the TSP is held floated, it comes into contact with steam with a higher efficiency and continuous treatment is feasible. If the internal pressure in the tunnel- and oscillating-type fluidized bed is positive, the degree of contact with oxygen can be reduced by inhibiting the entry of outside air, and further the ambient temperature and the TSP temperature can be maintained at about 100° C.

When required, the TSP contacted with steam can be dried to a water content of 3 to 12% (mainly, in the case of texturizing the TSP by the extrusion cooking method). The dried TSP has an improved flavor and gives an excellent mouthfeel like meat when reconstituted with hot water.

According to the process of the present invention as described above, a TSP can be effectively deodorized by a single-step steam treatment, namely by a simplified procedure. The TSP is produced without a likelihood of hardening in texture or discoloring and is very useful in various applications as a food material of superior flavor.

EXAMPLES

The present invention is described below in more detail with reference to the following Examples.

Example 1

One hundred parts by weight (hereinafter "part by weight" being abbreviated to "part") of a mixture of 94 parts of defatted soybean, 5 parts of isolated soybean protein (trade name "FUJIPRO-E", product of Fuji Oil Co., Ltd.) and 1 part of soybean oil, together with 40 parts of water was supplied to an extruder and pressurized, heated and extruded, giving a textured soybean protein (TSP). Immediately after texturization, the TSP had a temperature of 95° C. and a water content of 28%.

The extruder used in the Examples was of the twin-screw type and operated under conditions: the number of revolution (screw) of 200 rpm, temperatures of 80° C. on the barrel inlet side, 110° C. in the central part and 145° C. on the outlet side, a die bore diameter of 5 mm and a throughput of 40 kg/hr.

One kilogram of the obtained TSP was immediately placed into a steam boiling kettle. Steam was supplied at a flow rate of 15 kg/hr for the time period shown in Table 1. In Table 1, the amount of steam is expressed in weight % based on the TSP.

Thereafter, the TSP was dried with hot air and reconstituted with hot water in an amount of 5 times the weight of TSP to give a sample. After a lapse of 5 minutes, an organoleptic test of the sample was carried out by 10 expert panelists. The same test was conducted on the samples prepared in subsequent Examples and Comparative Example.

The flavor was rated by giving 1 point to an untreated sample and 10 points to a tasteless and odorless sample. The results are shown in Table 1.

TABLE 1

| Test Run No. | Treatment time | Amount of steam (%) | Number of panelists evaluating the sample as having reduced soybean odor | Number of panelists evaluating the sample as substantially tasteless and odorless | Evaluation of flavor |
|---|---|---|---|---|---|
| 1 | None | 0 | None | None | 1 point |
| 2 | 15 sec. | 6.25 | 4 panelists | None | 2 points |
| 3 | 30 sec. | 12.5 | 9 panelists | None | 6 points |
| 4 | 1 min. | 25 | All | None | 7 points |
| 5 | 2 min. | 50 | All | 6 panelists | 8 points |
| 6 | 4 min. | 100 | All | 8 panelists | 8 points |
| 7 | 8 min. | 200 | All | All | 9 points |
| 8 | 16 min. | 400 | All | All | 9 points |

From the results of Table 1, the following can be clearly seen. In Test Run 1 wherein the sample was not treated with steam, all panelists stated that the sample had a soybean odor and rated the flavor as 1 point. With an increase in the amount of steam, an increasing number of panelists acknowledged the decrease of soybean odor. In Test Run 4 using 25% of steam for treatment, all panelists recognized the reduction of soybean odor, giving 7 points in the evaluation of flavor. In Test Run 7 using 200% of steam for treatment, all panelists assessed the sample as virtually tasteless and odorless, giving 9 points in the evaluation of flavor, that is to say, the sample showed good results.

Example 2

The TSP obtained by texturization in the same manner as in Example 1 was continuously supplied immediately after heat-texturization to a tunnel- and oscillating-type fluidized bed (wherein an oscillating-type conveyor with a tunnel structure had a meshed bottom, so that the TSP was made to float in a fluid state over the meshed bottom through which hot air was blown upward). The TSP was brought into contact with steam under the conditions shown in Table 2. The TSP was treated with steam in an amount of 400 kg/hr, and was passed through the fluidized bed for 1 minute.

Subsequently in the same manner as in Example 1, the obtained TSP was dried with hot air and reconstituted with hot water to give a sample, and an organoleptic test was carried out. The results are shown in Table 2.

TABLE 2

| Test Run No. | Flow rate of steam (kg/hr) | Amount of steam (%) | Number of panelists evaluating the sample as having reduced soybean odor | Number of panelists evaluating the sample as substantially tasteless and odorless | Evaluation of flavor |
|---|---|---|---|---|---|
| 9 | 25 | 6.25 | 6 panelists | None | 4 points |
| 10 | 50 | 12.5 | All | None | 7 points |
| 11 | 100 | 25 | All | 6 panelists | 8 points |
| 12 | 200 | 50 | All | 8 panelists | 8 points |
| 13 | 400 | 100 | All | All | 9 points |

From the results of Table 2, the following can be clearly seen. In Test Run 9 wherein steam was used for treatment in an amount of 6.25% of the sample, 6 panelists stated that the sample had a reduced soybean odor. In Test Run 10 using 12.5% of steam for treatment, all panelists recognized a decreased soybean odor, giving 7 points in the evaluation of flavor. In Test Run 13 using 100% of steam for treatment, all panelists assessed the sample as substantially tasteless and odorless, giving 9 points in the evaluation of flavor which means that the sample gave good results. The above results show that when a TSP is treated with steam using a tunnel- and oscillating-type fluidized bed, the TSP is contacted with steam with higher efficiency because the TSP is floated in a fluid state.

Example 3

A protein slurry with a PH adjusted to 5.0 (an acid-deposited curd of soybean protein having a solid content of 25% by weight) was sent as pressurized to a pipe heat exchanger (4 mm in diameter, 20 m in length), heated to 150° C. and discharged through an orifice (1.0 mm in diameter) to give a TSP having texturized structure. The temperature of the TSP immediately after heat-texturization was 95° C. and a water content thereof was 73%.

The obtained TSP was immediately continuously supplied to a tunnel-type steamer to come into contact with steam. The throughput was 100 kg/hr, the amount of steam was 70 kg/hr and the time of TSP passing through the steamer was 15 minutes.

Subsequently in the same manner as in Example 1, the obtained TSP was reconstituted with hot water to give a sample, and an organoleptic test was carried out. The results are shown in Table 3.

TABLE 3

| Test Run No. | Treatment with steam | Number of panelists evaluating the sample as having reduced soybean odor | Number of panelists evaluating the sample as substantially tasteless and odorless | Evaluation of flavor |
|---|---|---|---|---|
| 14 | None | None | None | 5 points |
| 15 | Treated | All | 7 panelists | 9 points |

From the results of Table 3, the following can be clearly seen. In Test Run 14 wherein the sample was not treated with steam, all panelists assessed the sample as having a soybean odor. In Test Run 15 wherein the sample was treated with steam, all panelists recognized that the sample had a reduced soybean odor, and 7 panelists assessed the sample as substantially tasteless and odorless.

Comparative Example 1

The TSP obtained by texturization in the same manner as in Example 1 was left to stand in the atmosphere after heat-texturization for 1 hour and brought into contact with steam under the same conditions as in Test Run 5 of Example 1.

The TSP immediately before contact with steam showed a water content of 22% and had a temperature as low as 37° C.

Subsequently in the same manner as in Example 1, the TSP was dried with hot air and reconstituted with hot water to give a sample, and an organoleptic test was carried out. The results are shown below in Table 4.

Comparative Example 2

The TSP obtained by texturization in the same manner as in Example 1 was dried with hot air at 90° C. after heat-texturization and brought into contact with steam under the same conditions as in Test Run 5 of Example 1. The TSP immediately before contact with steam had a relatively high temperature of 73° C. and the water content thereof was as low as 8% due to drying. The results are shown in Table 5.

TABLE 4

| Test Run No. | Treatment time | Amount of steam (%) | Number of panelists evaluating the sample as having reduced soybean odor | Number of panelists evaluating the sample as substantially tasteless and odorless | Evaluation of flavor |
|---|---|---|---|---|---|
| 16 | 2 min | 50 | 5 panelists | None | 3 points |

TABLE 5

| Test Run No. | Treatment time | Amount of steam (%) | Number of panelists evaluating the sample as having reduced soybean odor | Number of panelists evaluating the sample as substantially tasteless and odorless | Evaluation of flavor |
|---|---|---|---|---|---|
| 17 | 2 min | 50 | 4 panelists | None | 2 points |

From the results of Table 4, it can be seen that when the TSP had a low temperature immediately before contact with steam, flavor was not improved to an extent as high as in Test Run 5 of Example 1.

From the results of Table 5, it is apparent that when the TSP had a low water content immediately before contact with steam, flavor was not improved to an extent as high as in Test Run 5 of Example 1. This is presumably because the water content was reduced due to drying so that the TSP hardened in texture, enclosing the soybean odor inside, and that even when contacted with the TSP, steam failed to reach the microscopic structure of TSP, consequently failing to eliminate soybean odor.

We claim:

1. A process for preparing a textured soybean protein, the process comprising the steps of pressurizing and heating a raw material containing a soybean protein and water, quickly releasing the pressure to texturize the soybean protein and, while retaining heat from said heating to provide a temperature of 45° C. or higher, bringing the textured soybean protein (TSP) thus obtained into contact with saturated steam while the TSP remains hot and is not completely dried.

2. The process according to claim 1, wherein at the time of contact with steam, the textured soybean protein has a water content of at least about 12%.

3. The process according to claim 1 or 2, wherein the TSP is brought into contact with steam while being floated in steam.

4. The process according to claims 1 or 2, wherein the amount of steam is 5 to 1,000% by weight of the TSP.

5. The process according to claim 3 wherein the amount of steam is 5 to 1,000% by weight of the TSP.

* * * * *

UNITED STATES PATENT AND TRADEMARK OFFICE
CERTIFICATE OF CORRECTION

PATENT NO. : 5,858,448
DATED : January 12, 1999
INVENTOR(S) : Sakata et al.

It is certified that error appears in the above-identified patent and that said Letters Patent is hereby corrected as shown below:

<u>Title page,</u>
Item [56], References Cited, U.S. PATENT DOCUMENTS, add:

| | | |
|---|---|---|
| -- 4,943,441 | McCabe | 7/24/90 |
| 4,758,441 | Negishi et al. | 7/19/88 |
| 4,675,198 | Sevenants | 6/23/87 |
| 4,247,566 | Inagami et al. | 1/27/81 |
| 4,205,094 | Baird et al. | 5/27/80 |
| 3,642,490 | Hawley et al. | 2/15/72 -- |

Signed and Sealed this

Nineteenth Day of August, 2003

JAMES E. ROGAN
*Director of the United States Patent and Trademark Office*